US009350690B2

(12) United States Patent
Meijer et al.

(10) Patent No.: US 9,350,690 B2
(45) Date of Patent: May 24, 2016

(54) USER PERCEPTION OF ELECTRONIC MESSAGING

(71) Applicant: Microsoft Technology Licensing, LLC, Redmond, WA (US)

(72) Inventors: Henricus Johannes Maria Meijer, Mercer Island, WA (US); Dragos A. Manolescu, Kirkland, WA (US); Matthew Jason Pope, Seattle, WA (US); Matthew B. MacLaurin, Woodinville, WA (US); F. David Jones, Bellevue, WA (US); Mary P. Czerwinski, Woodinville, WA (US); Raymond E. Ozzie, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/635,875

(22) Filed: Mar. 2, 2015

(65) Prior Publication Data

US 2015/0172236 A1 Jun. 18, 2015

Related U.S. Application Data

(63) Continuation of application No. 12/240,569, filed on Sep. 29, 2008, now abandoned.

(51) Int. Cl.
*G06F 15/16* (2006.01)
*H04L 12/58* (2006.01)
*H04L 12/26* (2006.01)

(52) U.S. Cl.
CPC .............. *H04L 51/046* (2013.01); *G06F 15/16* (2013.01); *H04L 43/08* (2013.01)

(58) Field of Classification Search
USPC .................................. 709/206–207, 223–224
See application file for complete search history.

(56) References Cited

U.S. PATENT DOCUMENTS

| 5,905,863 A | 5/1999 | Knowles et al. |
| 6,594,673 B1 | 7/2003 | Smith et al. |

(Continued)

FOREIGN PATENT DOCUMENTS

WO WO2008040004 A2 4/2008

OTHER PUBLICATIONS

U.S. Appl. No. 12/394,251, filed Feb. 27, 2009, Dragos A. Manolescu; Mary P. Czerwinski; David F. Jones; Henricus Johannes Maria Meijer; Raymond E. Ozzie; Matthew J. Pope, "Visualization of Participant Relationships and Sentiment for Electronic Messaging," 48 pages.

(Continued)

*Primary Examiner* — Philip B Tran
(74) *Attorney, Agent, or Firm* — Steve Wight; Sandy Swain; Micky Minhas

(57) ABSTRACT

Determining user use context for electronic messaging and disseminating a subset of the user use context to recipients and/or senders of such electronic message is disclosed herein. By way of example, the user use context can be based on a general context of recipients, such as speed with which a message is disseminated or consumed, number of child messages spawned, rate at which such messages are spawned, and so on. Additionally, user use context can also be based on individual context, by comparing individual interaction to a message (e.g., time to read, time to delete, number of child messages, etc.), with a baseline usage context determined for the individual. The context can be disseminated to recipients of the message or to the sender, to provide an overview of perception of the electronic message.

20 Claims, 11 Drawing Sheets

(56) References Cited

U.S. PATENT DOCUMENTS

| | | | |
|---|---|---|---|
| 6,631,412 | B1 | 10/2003 | Glasser et al. |
| 6,816,873 | B2 | 11/2004 | Cotner et al. |
| 6,819,256 | B2 | 11/2004 | Hampton |
| 6,967,594 | B2 | 11/2005 | Gerrity |
| 7,007,067 | B1 | 2/2006 | Azvine et al. |
| 7,073,129 | B1 | 7/2006 | Robarts et al. |
| 7,167,910 | B2 | 1/2007 | Farnham et al. |
| 7,281,215 | B1 | 10/2007 | Canfield et al. |
| 7,395,507 | B2 | 7/2008 | Robarts et al. |
| 7,506,263 | B1 | 3/2009 | Johnston et al. |
| 7,610,279 | B2 | 10/2009 | Budzik et al. |
| 7,664,734 | B2 | 2/2010 | Lawrence et al. |
| 8,341,018 | B2 | 12/2012 | Malik et al. |
| 2001/0049617 | A1 | 12/2001 | Berenson et al. |
| 2002/0073313 | A1 | 6/2002 | Brown et al. |
| 2003/0079015 | A1 | 4/2003 | Fein et al. |
| 2003/0158855 | A1 | 8/2003 | Farnham et al. |
| 2003/0164862 | A1 | 9/2003 | Cadiz et al. |
| 2003/0174060 | A1 | 9/2003 | Gerrity |
| 2005/0193011 | A1 | 9/2005 | Peebles et al. |
| 2005/0204309 | A1 | 9/2005 | Szeto |
| 2005/0251555 | A1* | 11/2005 | Little .......................... 709/206 |
| 2006/0069728 | A1* | 3/2006 | McEvilly et al. ............ 709/206 |
| 2006/0080321 | A1 | 4/2006 | Horn et al. |
| 2006/0173824 | A1 | 8/2006 | Bensky et al. |
| 2006/0173957 | A1 | 8/2006 | Robinson et al. |
| 2007/0055782 | A1 | 3/2007 | Wright et al. |
| 2007/0066327 | A1 | 3/2007 | Karmakar |
| 2007/0237130 | A1 | 10/2007 | Milstein et al. |
| 2007/0266025 | A1 | 11/2007 | Wagner et al. |
| 2007/0294763 | A1 | 12/2007 | Udezue et al. |
| 2008/0147805 | A1 | 6/2008 | Abecassis et al. |
| 2008/0172464 | A1 | 7/2008 | Thattai et al. |
| 2009/0106676 | A1 | 4/2009 | Brezina et al. |
| 2009/0125371 | A1 | 5/2009 | Neylon et al. |
| 2009/0182828 | A1 | 7/2009 | Owens et al. |
| 2010/0042470 | A1* | 2/2010 | Chang et al. .................... 705/10 |
| 2010/0082751 | A1 | 4/2010 | Meijer et al. |
| 2014/0039877 | A1* | 2/2014 | Guenigault et al. ............ 704/9 |

OTHER PUBLICATIONS

Cowell et al., "Understanding the dynamics of collaborative multi-party discourse," Information Visualization (2006) 5, 250-259 <<http://www.cs.washington.edu/homes/aha/papers/RaceJournal_andrew07.pdf>> 10 pages.

Damian et al., "Peer-Sensitive ObjectRank—Valuing Contextual Information in Social Networks," <<http://www.educational-technology.de/Arbeiten/Publikationen/2005/WISE.pdf>> Last accessed Aug. 4, 2008, 8 pages.

Hsieh et al., "Field Deployment of IMBuddy: A Study of Privacy Control and Feedback Mechanisms for Contextual IM," J. Krumm et al., (Eds.): UbiComp 2007, LNCS 4717, pp. 91-108, 2007 <<http://www.springerlink.com/content/y32j7k2027944217/fulltext.pdf>> Last accessed Aug. 5, 2008, 18 pages.

Neviarouskaya et al., "Recognition of Affect Conveyed by Text Messaging in Online Communication," D. Schuler (Ed.): Online Communities and Social Comput., HCII 2007, LNCS 4564, pp. 141-150, 2007. cc Springer-Verlag Berlin Heidelberg 2007 <<http://research.nii.ac.jp/~prendinger/papers/alena-HCI2007.pdf>> 10 pages.

Non-Final Office Action for U.S. Appl. No. 12/394,251, mailed on Oct. 22, 2014, Manolescu et al., "Visualization of Participant Relationships and Sentiment for Electronic Messaging," 21 pages.

Office Action for U.S. Appl. No. 12/394,251, mailed on Nov. 10, 2011, Dragos A. Manolescu, Visualization of Participant Relationships and Sentiment for Electronic Messaging,, 22 pages.

Office action for U.S. Appl. No. 12/394,251, mailed on Nov. 26, 2013, Manolescu et al., "Visualization of Participant Relationships and Sentiment for Electronic Messaging," 21 pages.

Office action for U.S. Appl. No. 12/394,251, mailed on May 1, 2013, Manolescu et al., "Visualization of Participant Relationships and Sentiment for Electronic Messaging," 22 pages.

Non-Final Office Action for U.S. Appl. No. 12/394,251, mailed on May 26, 2011, Dragos A. Manolescu, "Visualization of Participant Relationships and Sentiment for Electronic Messaging," 19 pages.

Final Office Action for U.S. Appl. No. 12/394,251, mailed on Jun. 20, 2014, Manolescu et al., "Visualization of Participant Relationships and Sentiment for Electronic Messaging," 22 pages.

Office Action for U.S. Appl. No. 12/240,569, mailed on Aug. 20, 2014, Meijer et al., "User Perception of Electronic Messaging," 10 pages.

Office action for U.S. Appl. No. 12/394,251, mailed on Sep. 17, 2012, Manolescu et al., "Visualization of Participant Relationships and Sentiment for Electronic Messaging," 23 pages.

Roussinov et al., "Message Sense Maker: Engineering a Tool Set for Customer Relationship Management," Proceedings of the 36th Hawaii International Conference on System Sciences—2003 <<http://cq-pan.cqu.edu.au/david-jones/Readings/Conferences/HICSS36/DATA/INCRM06.PDF>> 7 pages.

Sebrechts et al., "Visualization of Search Results: A Comparative Evaluation of Text, 2D, and 3D Interfaces," 1999 <<http://www.cs.ubc.ca/~tmm/courses/infovis/morereadings/sebrechts.sigir99.pdf>> 8 pages.

Smith et al., "Visualization Components for Persistent Conversations," Sep. 21, 2000, <<http://research.microsoft.com/research/coet/Communities/TRs/00-98.pdf>> 9 pages.

Tier, Definition of, Retrieved on Nov. 3, 2011 at <<http://dictionary.reference.com/browse/tier>>, 2 pages.

Venolia et al., "Understanding Sequence and Reply Relationships within Email Conversations: A Mixed-Model Visualization," CHI 2003, Apr. 5-10, 2003. Ft. Lauderdale, Florida, USA. Copyright 2003 <<http://grouplab.cpsc.ucalgary.ca/grouplab/uploads/Publications/Publications/2003-UnderstandingSequence.CHI.pdf>> 8 pages.

* cited by examiner

USER PERCEPTION OF ELECTRONIC MESSAGING

RELATED APPLICATION

This application is a continuation of and claims priority to U.S. patent application Ser. No. 12/240,569, filed on Sep. 29, 2008, the disclosure of which is incorporated by reference herein.

BACKGROUND

E-mail and other electronic messaging systems have enabled a technical revolution in business and personal communications, and have provided a platform for social and organizational networking. In recent years, use of electronic messaging, such as e-mail, short messaging, text messaging, blogging, electronic forums, and so on, has increased exponentially due to the inexpensive and near instantaneous communication platform that electronic messaging provides. Such platforms have rapidly decreased time required to share and disseminate information, whether for a large, multi-national organization, a network of friends or family members, or remotely located small business partners.

The advent of electronic messaging, whether via fixed line communications (e.g., computer and Internet) or mobile communications (e.g., cellular phone), has led to diverse business ventures supporting this technology. Initially, such ventures were limited to large organizations with enough capital to support initial infrastructure investments required for long range electronic communication. For instance, the Internet was initially a defense research project funded with military and university funds. As commercial applications became apparent, private sector ventures leveraged the initial structure to establish public and private links to the initial architecture. The first forms of electronic messaging over the Internet consisted of e-mail; however, the versatile transport control protocol/Internet protocol (TCP/IP) enabled other messaging architectures, such as short message service (SMS), text messaging, to couple with the basic communication infrastructure. As the World Wide Web expanded across the Internet infrastructure and hypertext transport protocol (HTTP) and other protocol web pages became a prevalent form of data exchange, message forums, blogging and other forms of Web-based electronic messaging became popular. One of the more sophisticated recent advancements are the social networking sites that inter-link individuals, or nodes, based on inter-personal relationships, or ties. These sites provide a simple and powerful platform to share information, communicate real-time or in delayed-time (e.g., via posting on a forum), and so on.

Although more advanced electronic communication platforms have developed over time, the original e-mail system has survived as one of the most prevalent messaging systems, both in business and private communication. One reason for this is the simplicity of text-based communication coupled with the flexibility and feature richness of modern applications operating on a standardized operating system. For instance, various application files can be attached or cut-n-pasted to e-mail, and bundled into data packets transmitted by the e-mail application. Furthermore, e-mail can quickly be disseminated to large numbers of individuals (e.g., individually or associated with a group-name), forwarded to more individuals, responded to, and so on, resulting in mass communication. A chain of e-mails, comprising an original or parent message and child or forwarded and/or replied to messages, can convey the history of a conversation between large numbers of individuals. Accordingly, e-mail serves as a basis for most newer technologies, often leading the way for newer electronic messaging innovations, well over twenty years after its' inception.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for determining user use context for electronic messaging and disseminating a subset of the user use context to recipients and/or senders of such message. The user use context can be based on global recipient context, such as speed with which a message is disseminated and/or consumed by recipients, number of child messages spawned, speed with which such messages are spawned, and so on. Additionally, user use context can also be based on individual context (or group-based recipient context), based on individual interaction with the message (e.g., time to read, time to delete, number of child messages, etc.) optionally weighted by moving statistics of the individual's use context. The context can be disseminated to recipients of the message or to the sender, and can provide an overview of perception of the electronic message.

According to other aspects of the subject disclosure, provided is a mechanism for aggregating user use context of electronic messaging across a plurality of messaging platforms. A user's use of and interaction with multiple communication platforms, including e-mail, text messaging, mobile short messaging and like text and media platforms, as well as voice-based platforms such as phones, including mobile phones, voice over IP (VoIP) phones, landline phones, and so on, can be analyzed. The use and interaction can be analyzed to infer a baseline use context for the user, aggregated across the multiple communication platforms, and per platform. According to further aspects, upon receiving a message, the user's use context can be analyzed against the baseline context to provide a perception of the received message. Such perception can be reported to the user and/or returned to the initiator as substantive feedback.

In one or more additional aspects, disclosed is predictive context analysis for electronic messaging. Message compilation can be analyzed as a user enters text or other data into a message. Additionally, a superset of user use context generated for recipients of the message can be referenced to predict a disposition of the recipients, optionally as a function of the messaging platform in which the data is entered. Feedback can be given based on a comparison of the data entered and the predicted disposition of the recipients. Thus, as an example, if the data is determined to be abrasive in context, and a recipient is predisposed to respond negatively to abrasive messages, the feedback can suggest changing the context of the data and, in some aspects, point out particular portions of the data determined to be abrasive.

According to still other aspects of the subject disclosure, message monitoring is provided that can analyze disseminating messages and determine context of such messages. The determined context can be analyzed against one or more contextual thresholds and predetermined actions can be taken if a contextual threshold is exceeded. As examples, predetermined actions can include preventing dissemination of the message and/or child messages spawned there from, identifying additional recipients having a contextual interest to the message and adding such recipients to the message, and so on.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
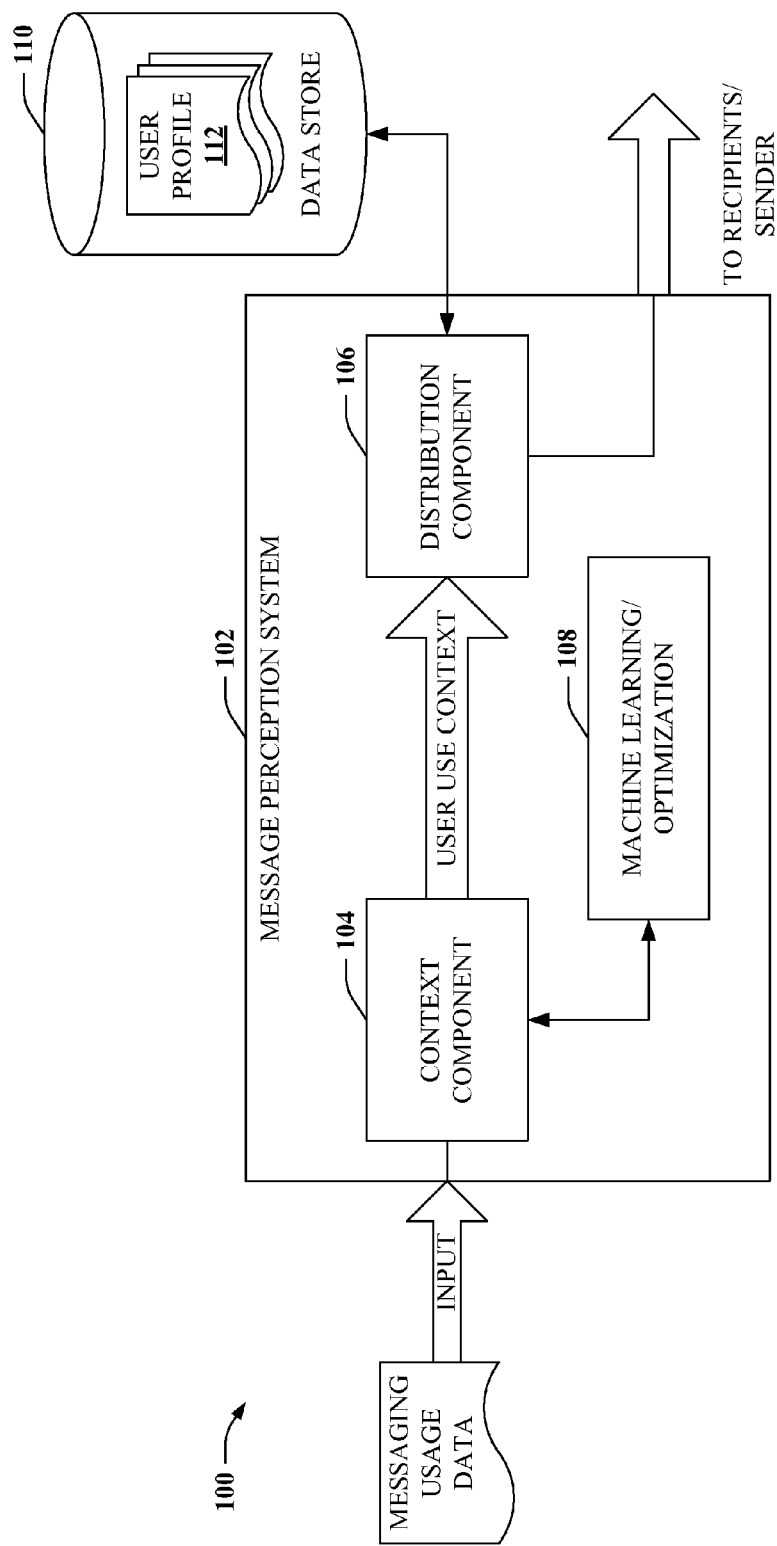
FIG. 1 depicts a block diagram of an example system that provides user use context for electronic messaging according to some aspects of the subject disclosure.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "engine", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component can be localized on one computer and/or distributed between two or more computers. As another example, an interface can include I/O components as well as associated processor, application, and/or API components, and can be as simple as a command line or a more complex Integrated Development Environment (IDE).

One limitation of text-based messaging systems is the inability to convey ideas, concepts, feelings and emotions as efficiently as in-person communication. Thus, emotions and conceptual ideas expressed in person via body language, vocal tone or inflection, somatic gestures, facial expressions and other information that provides context for in-person communication are limited or unavailable with text based communications. Even vocal communication (e.g., telephone) can capture only some of the contextual conveyances available with in-person communication. Accordingly, although electronic messaging allows for near-instantaneous communication to most parts of the world at low prices, determining a participant's context and perception is still very archaic.

Although user context, sentiment, perception, and other emotional responses or dispositions are difficult to convey via text, some innovation has occurred to overcome these limitations. In some cases, users of text-based messaging can simply indicate their emotions and feelings explicitly in text. However, individuals are often not practiced at articulating emotion and perception, so misunderstanding is common, and compilation of such a message is often slow and cumbersome. Other innovations include emoticons, such as ASCII text based emoticons (e.g., text-based symbol combinations resembling smiling faces, frowning faces, frustration etc., to convey emotions), graphical emoticons (e.g., animated cartoon-like figures, often round to represent a face, utilized to convey emotion), and the like. Although emoticons had been more widespread and arguably more successful in conveying emotion through a text-based medium than explicit articulation, they are still very limited in form and, like explicit articulation, must be input manually to a message.

In contrast to the manual examples of conveying sentiment and emotion described above, the subject disclosure provides an automated mechanism to determine and convey user context and user perception of electronic messaging, such as e-mail. A user's interactions with a messaging system, and with particular messages, can be monitored to determine a baseline context for the user. In some aspects, machine learning can be employed to optimize a statistical model for the user context over time and over multiple interactions with sent and received messages to arrive at an optimized baseline context. Such a context can be continually updated based on successive message interactions.

When an electronic message is received, a user's response to the message can be measured with respect to the baseline/optimal context to determine the user's perception of the particular message. Such interactions can include whether the e-mail was opened, time required to read the message (optionally normalized based on an amount of text data in the message), whether or how many times the message was forwarded, how many recipients the message was forwarded to, whether the message was deleted or saved in an inbox, whether the message was moved to a user-created folder, whether a link to a URL or other network link was followed, whether an attachment was opened, copied, cut-n-pasted, forwarded, etc., and so forth. Likewise, when a sender compiles a message, a manner of interacting with a messaging interface can be analyzed. Speed with which a user enters data into the message, the content of the message (e.g., analyzed via natural language processing, or other forms of language processing), a number of recipients, a number of people copied, and so on, can be utilized to enrich the use context information maintained for a user.

In at least one other example, user use context can include information pertaining to user location, or type of messaging interface/messaging device employed by the user. For instance, the user context can be updated to indicate a user is currently employing a mobile device to interface to a messaging platform, a portable phone, a desktop computer, a home computer, a laptop, etc. The use context information can optionally categorize the user's context as a function of messaging interface/device, classifying different contexts and user tendencies as a function of interface/device currently employed.

Furthermore, device-determined position (which can include position entered into a UI of the device by the user) can be utilized as a component of user use context information, either in conjunction with the type of messaging interface/messaging device, or separate there from. Thus, the user's location can be tracked and changes in such location updated. Use context data can further be classified as a function of current user location—identifying sentiments, predispositions, communication style, device tendencies, and so on—that are pertinent to one or more locations of the user. Thus, for instance, the use context can at a minimum include a current user location as well as a current device which the user is coupled to a messaging system with, and expose such information to participants of the messaging system. In at least some aspects, however, changes in user style, predisposition, sentiment, messaging preferences etc., can be determined as a function of location/device and exposed to other participants.

In some aspects of the subject disclosure, user use context can be determined at least in part from biometric data. For instance, a camera coupled with a computer can capture video data of a user interacting with a messaging interface. The video data can be sent or streamed to a computing device. A device application can analyze video data of the user, including facial expressions and changes thereof, changes in skin color, identify sweating, nervous activity, pupil size/dilation, and so on, to obtain biometric response data for the user. Infrared sensors can determine body temperatures, to detect changes in body temperature. Audio devices (e.g., microphones) can capture spoken words and sounds emitted by a user while interacting with a messaging device (e.g., the computer). Thus, where a user speaks a comment or makes a particular sound, laughs, becomes nervous, begins sweating, becomes relaxed, etc., a use context can be inferred. Biometric data, as well as user interface interactions can be aggregated to derive an overall use context of a user.

In a broader sense, a wide variety of interactions, some limited to a subset of messaging architectures and some universally applicable to any electronic messaging architecture, can be utilized to determine user sentiment or perception of a message. As an example, a user's interaction with a messaging device upon compiling or receiving a message, as well as biometric responses resulting from interacting with a message interface, can be analyzed to determine a particular sentiment or perception of the a message. It should be appreciated that, although only some examples of such interactions are specifically articulated here, the subject disclosure contemplates any such user interaction known to one of skill in the art, or made known to one of such skill by way of the context provided herein.

Upon determining user context (e.g., sentiment, perception) of a particular message, a response can be distributed to the sender of the message or to one or more participants (including, e.g., the user). The user's context can be aggregated with a plurality of other user contexts to determine a ranking for the message. In some aspects, the ranking can be modified based on importance or significance of a particular user. The ranking as well as a recipient context can be summarized via one or more keywords or other suitable tags attached to the message. In some aspects, the message can be sent with such tags; in other aspects, a message can be updated as recipient context information is gathered and analyzed. Accordingly, the sender, recipients and/or other participants can quickly judge the importance of a received message, as well as sentiment of other recipients. Thus, the subject disclosure provides a significant benefit, especially for users having a very high degree of exposure to incoming messages. As a particular example, such a user can visually filter importance of a received e-mail message based on the sentiment of other recipients that are tagged with the received message.

It should be appreciated that, as described herein, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). The aforementioned carrier wave, in conjunction with transmission or reception hardware and/or software, can also provide control of a computer to implement the disclosed subject matter. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Turning to the drawings, FIG. 1 illustrates a block diagram of an example system 100 that provides user use context for electronic messaging. The system 100 can be employed to automatically provide perception or sentiment of electronic messages, such as e-mail. The perception/sentiment can be distributed to participants (e.g., sender, recipient, copied or forwarded participant, respondent, etc.) of the e-mail, providing additional context to facilitate rapid or selective consumption, and an overall enhanced user experience of electronic messaging.

System 100 can include a message perception system 102 that receives messaging usage data as data input, and determines a context or manner in which a user employs a messaging system to generate a user use context. The user use context can be optimized over time, based on multiple user interactions with the messaging system, to more accurately reflect a user's predisposition toward the messaging system. The use context can be distributed by message perception system 100 to the user or other users of the messaging system to provide information about how a message is received.

The messaging usage data can comprise any suitable quantitative or qualitative representation of a user's interaction(s) with received/sent electronic messages, or with an interface for the electronic messages (e.g., such as an e-mail user interface). User interactions can include user interface commands/inputs undertaken after receiving a message (e.g., delete, forward, save, move to a user-defined folder, indicate as spam or not spam, provide an explicit importance or quality rating—low, medium, high etc.—for the message based on a user's impressions of the message, tag the message, and so on), time after receiving the message that such actions are undertaken, frequency with which a particular action is undertaken (among multiple received messages), and the like. Additionally, the interactions can include biometric responses obtained through one or more biometric sensors coupled with a messaging device or messaging interface. Such interaction data is received at a context component 104 that determines user context from such data. Context component 104 can couple to a messaging platform (not depicted) and extract the data or query a messaging platform configured to monitor and collect such data. As an additional source of user context data, a user profile 112, specifying what context data to distribute to a user and when, can be accessed to obtain user preferences with respect to distribution of use context information (see below). The distribution preferences can also be employed by context component 104 to determine overall user use context data.

Where multiple messages are analyzed, context component 104 can employ statistics to determine a user's average, median, most likely, least likely, etc., response(s) to a received message, or user interface command(s) employed with a sent message. A context superset can be established for the user based on the commands/inputs, time to implement such commands/inputs, and the statistics generated over multiple user interactions. Context component 104 can employ a subset of the context superset pertinent to receiving a message, or sending a message, to establish one or more baseline contexts representative of the user's use of the messaging platform. Once the baseline user use context is determined, at least a subset of the baseline user use context can be output by message perception system 102 to provide a user's baseline context for a particular messaging system.

According to some aspects of the subject disclosure, message perception system 102 can employ machine learning and optimization 108 to more accurately match the use context to a user's actual use of a messaging platform over multiple messaging instances. Furthermore, the optimization 108 can update the use context over time to accommodate for changes in a user's interaction with a messaging system. In order to infer user context having a highest probability of matching a user's actual use of the messaging system, machine learning and optimization component 108 can utilize a set of models (e.g., user interface model, user use history models, user biometric response models, use statistics model, etc.) in connection with determining or inferring user predisposition toward the messaging system in general and received messages in particular. The models can be based on a plurality of information (e.g., usage history, user profile information, message profile information, message system profile information, etc.). Optimization routines associated with machine learning and optimization component 108 can harness a model that is trained from previously collected data, a model that is based on a prior model that is updated with new data, via model mixture or data mixing methodology, or simply one that is trained with seed data, and thereafter tuned in real-time by training with actual field data based on parameters modified as a result of error correction instances.

In addition, machine learning and optimization component 108 can employ machine learning and reasoning techniques in connection with making determinations or inferences regarding optimization decisions, such as matching context of users (e.g., for one or more messaging systems) across a plurality of user use contexts. For example, machine learning and optimization component 108 can employ a probabilistic-based or statistical-based approach in connection with identifying and/or updating a baseline user use context for a plurality of users. Inferences can be based in part upon explicit training of classifier(s) (not shown), or implicit training based at least upon one or more monitored results, and the like.

Machine learning and optimization component 108 can also employ one of numerous methodologies for learning from data and then drawing inferences from the models so constructed (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various aspects described herein. Methodologies employed by optimization module 708 can also include mechanisms for the capture of logical relationships such as theorem provers or heuristic rule-based expert systems. Inferences derived from such learned or manually constructed models can be employed in other optimization techniques, such as linear and non-linear programming, that seek to maximize probabilities of error. For example, maximizing an overall accuracy of user use context data and a user's interactions with a messaging system can be achieved through such optimization techniques.

A subset of user use context data determined by message perception system 102 can be distributed among participants of a messaging system by distribution component 106. The distribution component 106 can reference a profile data store 110 to obtain user profile information 112 to determine what context data can be provided to a particular message participant, and when. Furthermore, as statistical models evolve, distribution component 106 can provide updated use context data, per a user's profile 112. Thus, for example, users can opt in or opt out of the use context distribution. In some aspects, users can specify particular messages, message platforms (e.g., e-mail, short message service, text message service, voice service—for instance employing speech to text translation—and so on) or particular senders/recipients about which use context data is to be distributed. Alternatively, or in addition, users can specify in the user profile 112 what type of collected data is to be transmitted to the user (e.g., average use statistics, user perceptions based on particular use versus baseline use). Accordingly, distribution of context data can be customized according to user desires.

In some aspects of the subject disclosure, use context data can be explicitly provided to a message participant. As examples, the use context data can be provided on user request (e.g., via a user interface command, query, dialogue box, a command to a message control platform, and so forth), as part of a periodic exposure to determined mood patterns of one or more other participants, as part of a an automatic or partially-automatic (e.g., based partially on user request or user profile) determination of message context compared with participant predisposition, or the like. Thus, for instance, an e-mail interface can have a dialogue box with dispositions of various e-mail participants selected by a user (or, e.g., based on identified message recipients). In such a case, a participant can attempt to compile a message considering a recipient's mood, such as typical mood for a time of day, concurrent mood determined from recent messaging interactions and/or biometric data, and so on. In another example, the use context could inform the participant that a recipient typically reads e-mail during the evening, and the message can be delayed until a time that the message is more likely to be read (e.g., or delayed so that the message is delivered at a time the recipient is likely to be reading e-mail). It should be appreciated that various other practical applications are possible based on exposing determined participant use context to other message participants. Although it is not feasible to articulate all such practical applications, those applications known to one of skill in the art, or made known to one of such skill by way of the context provided herein are contemplated as part of the subject disclosure.

Figure 2:
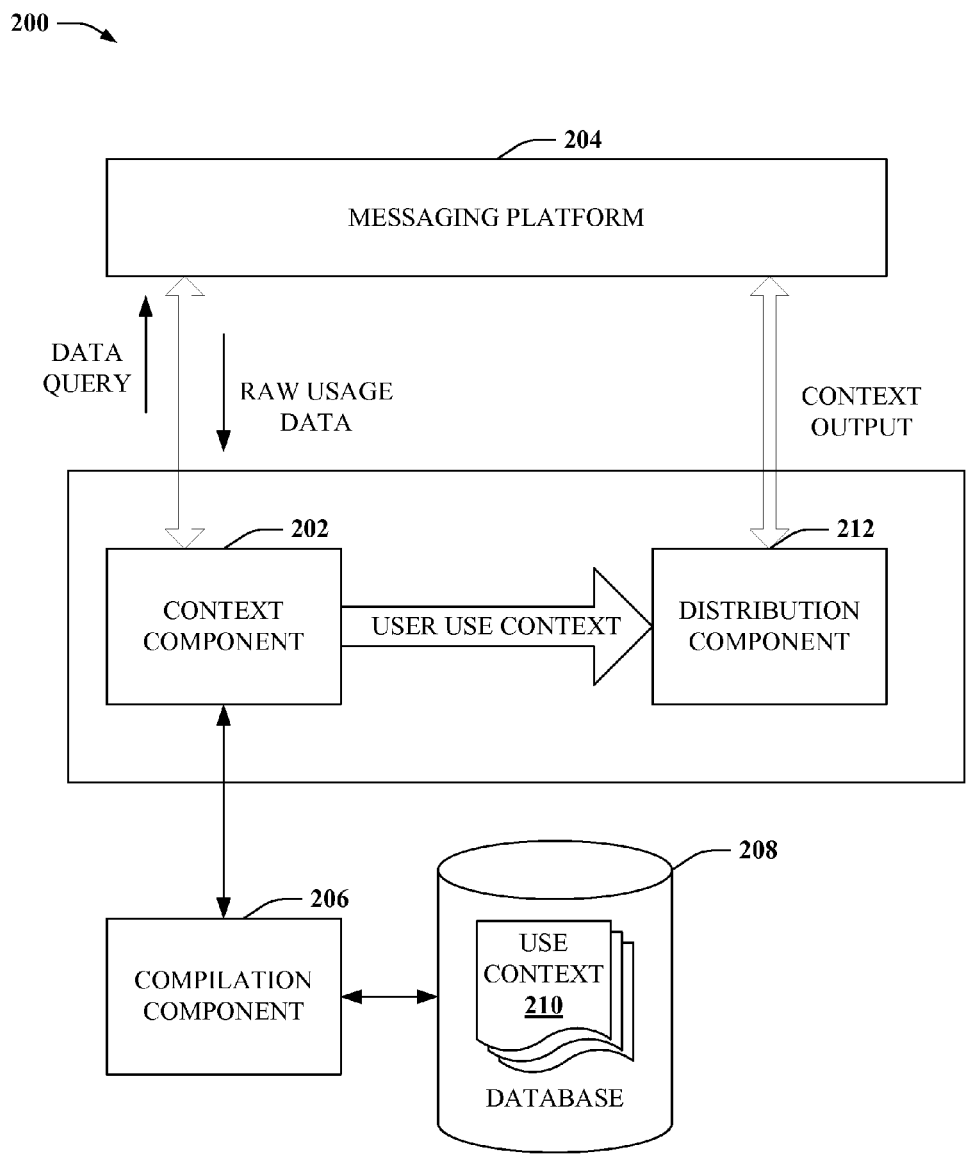
FIG. 2 illustrates a block diagram of a sample system that monitors a message platform to generate a use context for users of the platform.

FIG. 2 illustrates a block diagram of a sample system 200 that monitors a message platform to generate a use context for users of the platform. It should be appreciated that system 200 can be centrally located, querying different user applications for user use data, or distributed throughout user systems (e.g., comprising a client application downloaded and installed onto a user's message device, computer, etc.) to collect the user use data. User use context data can then be stored and referenced to determine information about a particular interaction with the message platform or response to a particular received message, such as user perception of the received message. Accordingly, system 200 can employ user use context to automatically infer emotion, reaction, sentiment, etc., information toward a particular instance of electronic communication.

System 200 comprises a context component 202 that interfaces with a messaging platform 204 employed by a plurality of users to send and receive electronic information. Context component 202 interfaces to the messaging platform 204 to collect data pertaining to users' interactions with a messaging system (e.g., e-mail, short message service, text messaging, instance messaging, or in some aspects, a voice-to-text translator coupled with a voice communication platform—such as telephone, circuit-switched mobile voice, VoIP, and so forth). Context component 202 can query the message platform to obtain user context information for each of the plurality of users based on individual user interactions with the platform 204, as described above with respect to FIG. 1, supra. Based on such information, context component 202 can generate a user use context for each of the users, and supply the user use contexts to compilation component 206.

The compilation component 206 can store the individual user use contexts in a use context file 210 in database 210. Stored context information can be referenced by context component 202 in determining a particular user's perception of a received instance of communication. That perception can be forwarded to a distribution component 212 that submits the perception to a recipient(s) or sender of the message, or updates tag information associated with a delivered message, via the messaging platform 204.

In some instances, the perception can be based on data included in the message (e.g., by employing natural language processing—not depicted) compared with a subset of a user's use context determined at least in part on the user's response to receiving similar data, or data sharing a similar context. In other instances, the perception can be based on responses of other message recipients. Such responses can optionally be weighted as a function of recipient importance with respect to a particular participant (e.g., established in the particular participant's user profile, or determined by context component 202).

Where suitable (e.g., to determine other recipient perception/importance), messaging platform 204 can delay delivery of a message to a particular recipient (e.g., per that participant's user profile) until a message perception is determined. Thus, an executive of an organization that receives a substantially large amount of messages can have a message delayed until perception information of other recipients of the message is determined. Thus, the executive can save time in consuming message data based on other recipients' perceptions. As another example, message delivery or receipt (e.g., when it is displayed as having been received for a user) can be based on a user's current context. In some aspects, a participant can specify a desired sender/recipient mood for delivery or display of a message; in other aspects, the current mood versus desired mood can be automatically determined. For instance, if a sender is determined to be in an angry mood (e.g., based on user use context such as high blood pressure, body temperature and rapid eye movement, determined from biometric sensors, and rapid data input, high keyboard pressure when typing, and so on) a message can be queued for a predetermined period (or, e.g., until the sender's mood changes or passes a threshold). Once the period expires, or the user's mood changes, the user can be queried to confirm that the message should be delivered. As another example, if a user is asking a favor of a recipient, delivery of the message can be delayed until the recipient is in a happy mood (e.g., determined from laughter, low blood pressure, low body temperature, relaxed posture and so forth).

It should be appreciated that context component 202 can determine perception information automatically based on user interaction with the message, as described herein, or based on manual input. For instance, context component 202 can implicitly determine context as described herein. In addition, context component 202 can couple or modify the implicit determination with explicit perception information (e.g., an importance ranking) provided by a user receiving a message. Accordingly, system 200 can provide a significant advantage over systems that require a recipient to tag a message and forward the tagged message in order to deliver context information to other users.

In addition to the foregoing, compilation component 206 can aggregate user use context data among a plurality of users of the messaging platform 204. For instance, individual user use contexts provided by context component 202 can be aggregated into an aggregated file at database 208. The aggregated context data can be employed to generate user-independent data (e.g., by averaging user use context data of the plurality of users), which can be employed as a baseline context to determine user perception of a message for an unknown user (e.g., a new user with no or little previous context information collected).

As an alternative to the foregoing, aggregated context information can be employed, to provide context information as a function of one or more categories of users, determined by categories of user context data. For instance, users determined to become emotionally affected by tone, content, sentiment, etc., of an electronic message (based on interaction with received messages and an emotion-based model trained on user interactions exhibiting strong emotion) can be categorized as having a sensitive disposition to such messages, or a subset of such messages (e.g., based on the tone, content, sentiment). As another example, users can be categorized as high use, medium use, low use, etc., users of the messaging platform 204 in comparison with the aggregated use data. By categorizing user personality, predisposition, usage, etc., system 200 can provide predictive information for message compilation (e.g., see FIG. 5, infra). Alternatively, or in addition, system 200 can infer a category for new users and generate user perception information based on interaction with a received message, in conjunction with establishing a user use context for the new user based on the interactions. The category can be updated over subsequent interactions to optimize the user category, or provide additional categories for the user based on content/tone/sentiment of the message.

Figure 3:
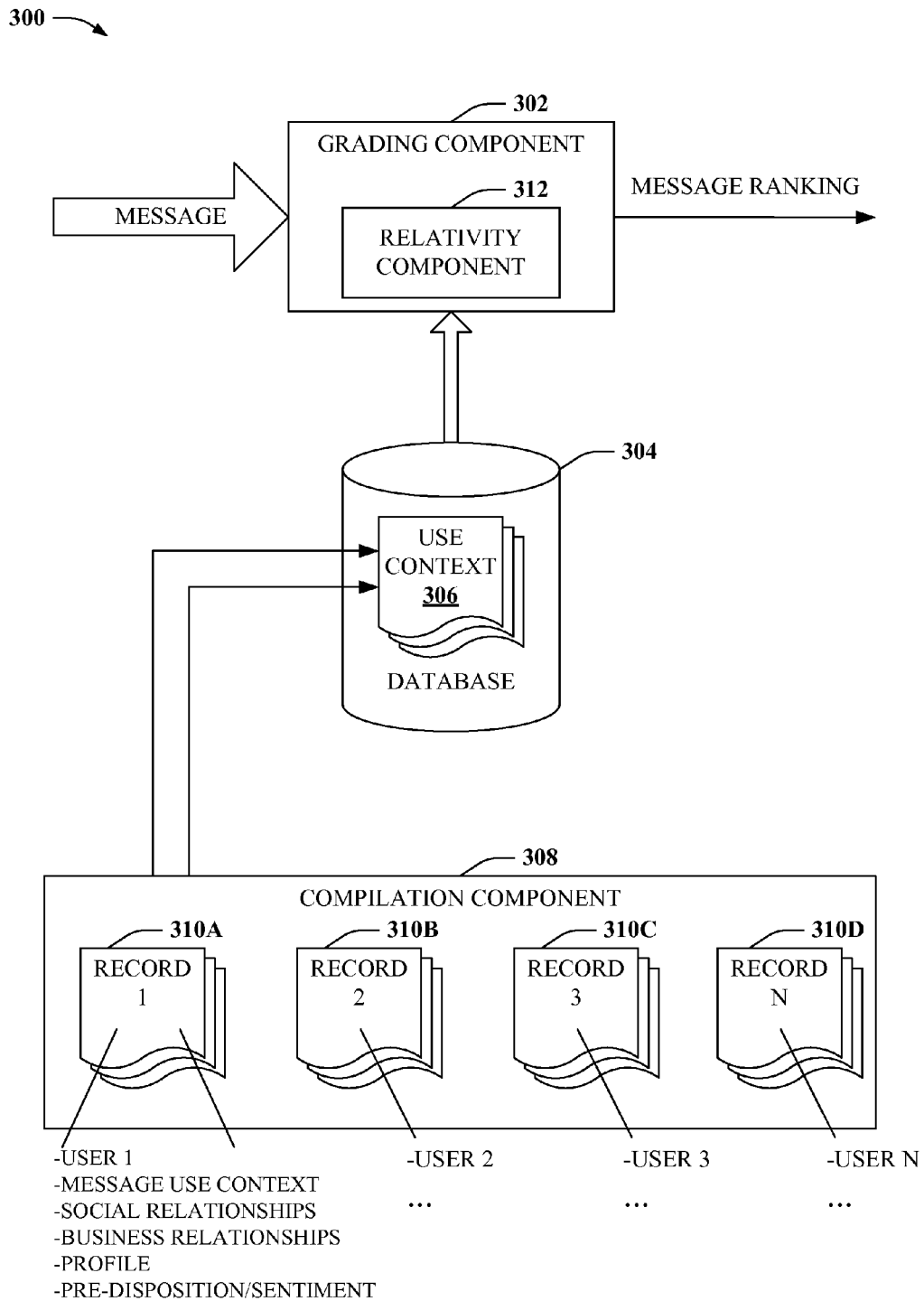
FIG. 3 depicts a block diagram of an example system that ranks messages according to recipient perception according to some aspects of the subject disclosure.

FIG. 3 depicts a block diagram of an example system 300 that can rank electronic messages. Ranking can be based on user perception determined from user context, optionally coupled with an importance factor associated with a recipient of the message. The ranking can then be provided to a sender or other recipients of the message as a preview of contextual response to the message. Accordingly, system 300 can import into electronic messaging some aspects of in-person communication, determined from users' perception of received messages in a context determined from user interaction with a messaging system.

System 300 comprises a grading component 302 that can establish a ranking for a particular message based on recipient perception of the message. Such perception can be an aggregate of individual user perceptions of the message, determined by comparing each user's interaction with/reaction to the message and a user use context 306 of each such user. Individual user contexts can be maintained in separate records 310A, 310B, 310C and 310D. Thus, for instance, a first record 310A can identify a first user, include a user use context of such user, profile of the first user, message predisposition, optionally determined as a function of one or more messaging platforms, and so forth. Additionally, the records 310A-310D can specify a social and/or organizational context of each user. In the case of a social context, social relationships or ties can be specified for a user relative other users of the messaging system, and stored in the records 310A-310D. Thus, for instance, record 1 310A can specify familial relationships, friendships, and other social networking contextual information for other users of a messaging system. In the case of an organizational context, the record 310A can specify business relationships, such as peer, managerial, subordinate, division, team and like relationships between members of the organization. Likewise, other user records 310B-310D can store social and/or organizational relationships of user 1, as well as other users (e.g., user 2, user 3, . . . , user N, where N is a positive integer).

Records 310A-310D can be maintained separately within the database 304, as well as in an aggregated record (not depicted). The aggregated record can combine user context of each record 310A-310D, as well as maintain a master social and organizational network tree, describing relationships and ties for each user context record 310A-310D stored at database 304. Thus, grading component 302 can employ the user use context information to determine user perception of the message, as discussed herein (e.g., based on user interaction with a messaging interface, biometric responses, and so on).

To rank a message, grading component 302 can compare user perception(s) to a ranking scale, determined at least in part from one or more perception thresholds, and provide a ranking for the message. Additionally, a relativity component 312 can modify a weight with which a particular user's perception of the message is factored into the ranking. Thus, for instance, a weight of a user's boss can be given higher rating than peers or subordinates. Additionally, organization executives can be given higher weight than the boss, and so on. Likewise, closer social relationships (e.g., determined from a number or frequency of messaging interactions, or context of message content) can be utilized to establish different weights for social user relationships as well. Such organizational and/or social relationships can be utilized as seed data to train one or more models for optimizing perception weights. The ranking(s) can therefore become adapted over time based on subsequent messaging interactions, user feedback, sender/recipient user profile, and the like. A message ranking can be output by grading component 302 and submitted to a messaging platform for delivery to the sender or a recipient(s) of a message, optionally as a function of user profile delivery options.

Figure 4:
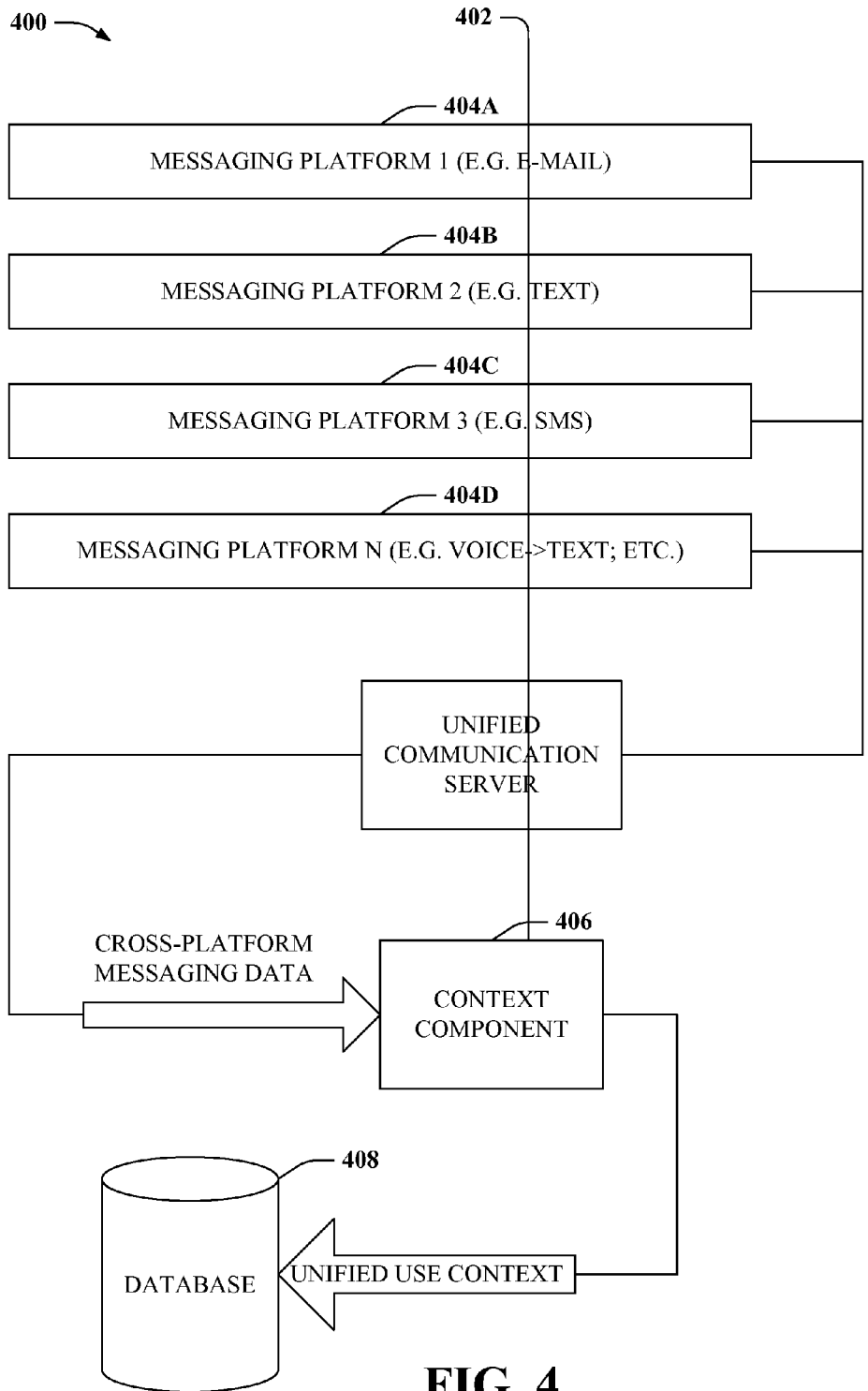
FIG. 4 illustrates a block diagram of a sample system that provides user perception across a unified communication platform according to further aspects.

FIG. 4 depicts a block diagram of a sample system 400 that provides user use context across a plurality of electronic messaging platforms 404A, 404B, 404C, 404D. Suitable messaging platforms can include e-mail (404A), text messaging (404B), short message service messaging (404C), a voice-text module (not depicted) integrated with or overlaid onto a voice communication system (404D), or other suitable messaging platforms, such as blogging websites, message forums, and so on. System 400 can comprise a unified communication server 402 that provides or employs a common node or interconnection of nodes between the messaging platforms 404A-404D to collect user use context information across the various platforms 404A-404D. In some aspects, the unified communication server 402 can distinguish the multiple platforms (404A-404D) as a function of platform provider (e.g., Microsoft, Lotus, T-Mobile, MSN messaging, etc.), product name (e.g., Microsoft's Outlook®, Lotus' Notes®, T-Mobile's short messaging service, and so on), product version (e.g., version 1.0, version 2.0) in lieu of or in addition to the type of messaging platform, as discussed above. Accordingly, the unified communication server 402 can be utilized to provide user use context for various purposes, including benchmarking new messaging platforms, new versions of such platforms, competitive analysis of such platforms, and so on.

In some aspects, the unified communication server 402 can reside on a user's computing device and collect usage context data from multiple messaging applications operating on the device. In other aspects, the server 402 can employ an intermediary network from the user's computer to collect data from a plurality of the user's devices coupled to the intermediary network. In such aspects, the server 402 can query a monitoring component (not depicted) that is installed on a device and configured to communicate with the server 402 via the intermediary network (e.g., a client application local to a device). In still other aspects, unified communication server 402 can reside on the intermediary network and collect data from the plurality of devices as well as the user's computing device. Other local and/or remote data monitoring configurations, known in the art or made known to one of skill in the art are also considered as part of the subject disclosure (e.g., see FIG. 11, infra).

Data collected by the unified communication server 402 can be forwarded to context component 406. As described herein, the context component 406 can determine user use context from the received data, in this case as a function of the cross-messaging platform data. Thus, a user's use context for each of the particular platforms 404A-404D can be determined, and stored in a database 408 per platform 404A-404D and as a unified, platform-independent usage context. Thus, in one instance, a user's interaction with/response to a received message can be compared with the context data associated with a platform over which the message is received. A perception of the message can be determined as described herein, which can be included in message ranking or used to derive keywords/tags for the message, and so on. In another instance, a platform-independent perception can be determined based on the platform-independent usage context. Such a perception can be useful in providing a generalized sentiment toward messaging, or can be utilized as a normalization factor to determine degrees of preference of the particular messaging systems 404A-404D for the user. In such aspects of the subject disclosure, system 400 can provide a very rich set of context information derived from a user's interactions with various types of messaging platforms. According to additional aspects, the cross-platform context data can also be aggregated across a plurality of users (e.g., see FIGS. 2 and 3, supra) to provide a large superset of data for general user context analysis. In addition, the superset of data can be useful to normalize analysis per user, per platform, per user perception, and so on.

Figure 5:
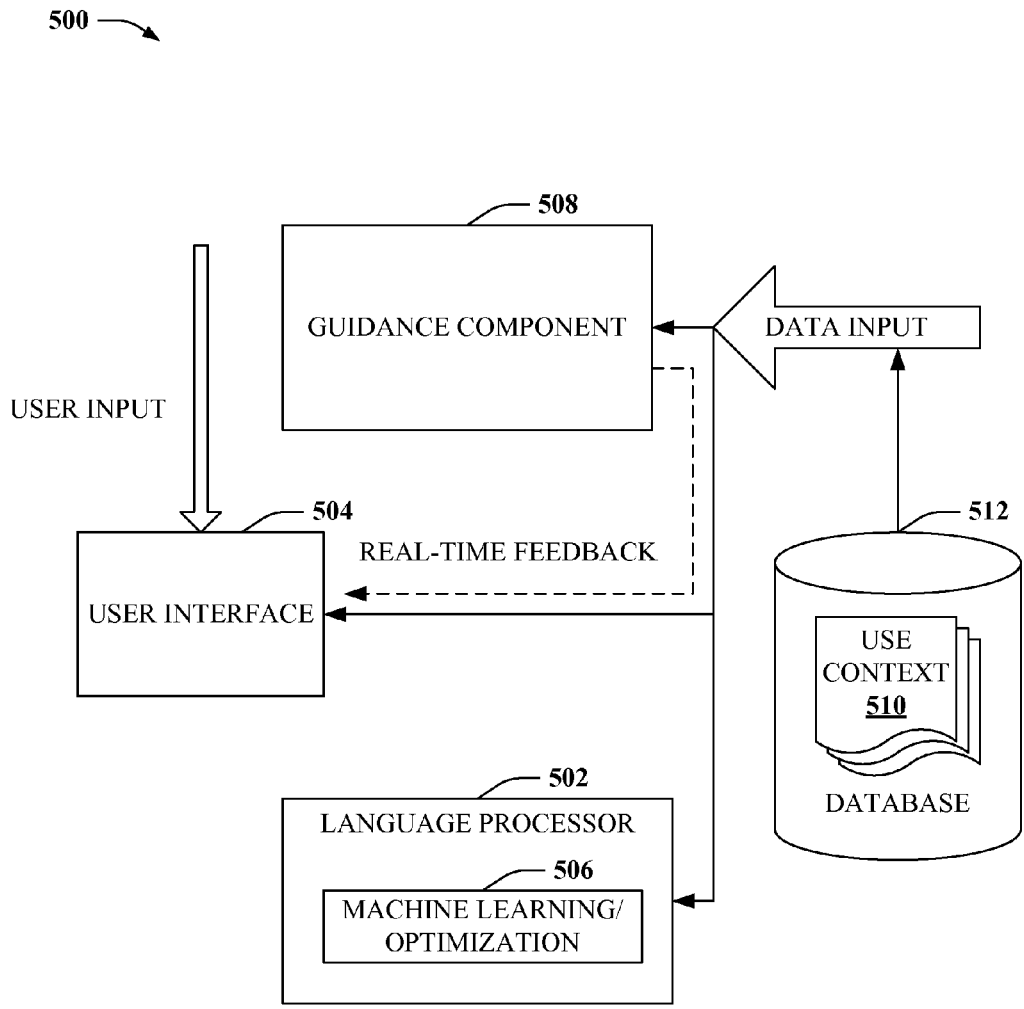
FIG. 5 depicts a block diagram of an example system that provides predictive perception of a message based on recipient and message compilation.

FIG. 5 depicts a block diagram of an example system 500 that provides predictive analysis and/or feedback for an electronic message. A language processor 502 can analyze data input into the message at a device user interface 504 as a user compiles the message (e.g., by typing, cut-and-pasting, by speaking to a microphone). A tone, sentiment or emotional perspective of the data (referred collectively hereinafter as sentiment) can be analyzed to provide a message sentiment. In some aspects, language processor 502 can employ machine learning and optimization 506 to adaptively determine the sentiment. Such determination can be based on data models and/or classifiers trained on use context data of a sender of the message. Optionally, the models/classifiers can be trained on a generic subset of user population, optionally having regional, maturity, religious, racial, organizational, social, etc., similarities as the sender and/or recipients of the message. In the latter case, language processor 502 can increase a likelihood that the determined sentiment of the message matches sender and/or recipient interpretations, based on slang, bias, or cultural interpretations.

The determined message sentiment can be provided to a guidance component 508, which references the message sentiment against user use context 510 data stored in a database 512. By comparing the message sentiment and user use context 510, guidance component 508 can infer a response to the message. Feedback can be provided to the sender based on the response, and optionally based on inferred user intent determined from a user use context of the sender.

As an illustrative example of the foregoing, a sender, while angry with a peer's project results, types an e-mail message to the peer (specified in a To: line) on a laptop computer (504), while out of the office. Language processor 502 determines the message sentiment is abrasive, angry, etc., and provides this determination to guidance component 508. The guidance component 508 determines that the recipient commonly sends and receives messages compiled in a slang or abrasive tone. Accordingly, guidance component 508 determines the message sentiment is appropriate or tolerable for the recipient, and provides neutral or no feedback to the sender. On the other hand, if the guidance component 508 determines that the recipient is sensitive to abrasive/angry context, guidance component 508 can provide feedback (e.g., a red flag, a warning sign, an illuminated red light, a bawling emoticon vigorously shedding tears, etc.) suggesting the message be altered based on the recipient's sensitivities. The latter feedback can optionally be conditioned on a use context of the sender, as well. For instance, if the sender typically sends abrasive messages even to sensitive individuals (particularly while out of the office), guidance component 508 can assume that the sender's intent is met by the abrasive sentiment of the message, and provide neutral or even positive feedback (e.g., a green light, thumbs up, a devilishly grinning smiley face, a brawny emoticon kicking sand in another's face, and so on), for the abrasive message.

Where the message includes recipients (e.g., on a "To:" line, "Copy:" line, etc.), guidance component 506 can extract user-specific context data from the use context 508. However, where recipient information is not yet provided, guidance component 506 can infer a potential recipient(s), based on prior messaging activity, or individuals socially related to the user, or having a business/enterprise relationship with the user. Alternatively, guidance component 506 can employ user-aggregated data, as described herein (e.g., see FIG. 4, supra) to provide generalized, user-independent feedback. Thus, prior to a sender indicating recipients of the message, guidance component 508 can provide feedback based on general user context data 510, or context data (510) derived from individuals sharing a social and/or enterprise network with the sender. Once one or more recipients are identified, guidance component 508 can tailor the feedback to the recipients and update the user interface 504 based thereon. Feedback, as described herein, can include a variety of user interface alerts, data outputs (e.g., a pop-up box or window), graphical rendering (e.g., pictures, signs, etc.), animated graphics (e.g., animated emoticons performing various actions), and so on, suitable to suggest a course of action to a sender (e.g., message is good, message should be modified, message is neutral, and so forth).

In some aspects, language processor 502 can indicate portions of data input by the sender that are predominant factors in determining the overall sentiment of the message. Thus, text can be highlighted, underlined, or rendered in some other suitable manner to distinguish the indicated portions from other input data. In such a manner, system 500 can enable predictive-feedback based on predicted message sentiment and recipient response, optionally modified as a function of inferred user intent. Accordingly, system 500 can be a powerful tool to bridge the current gaps between electronic messaging and in-person communication.

Figure 6:
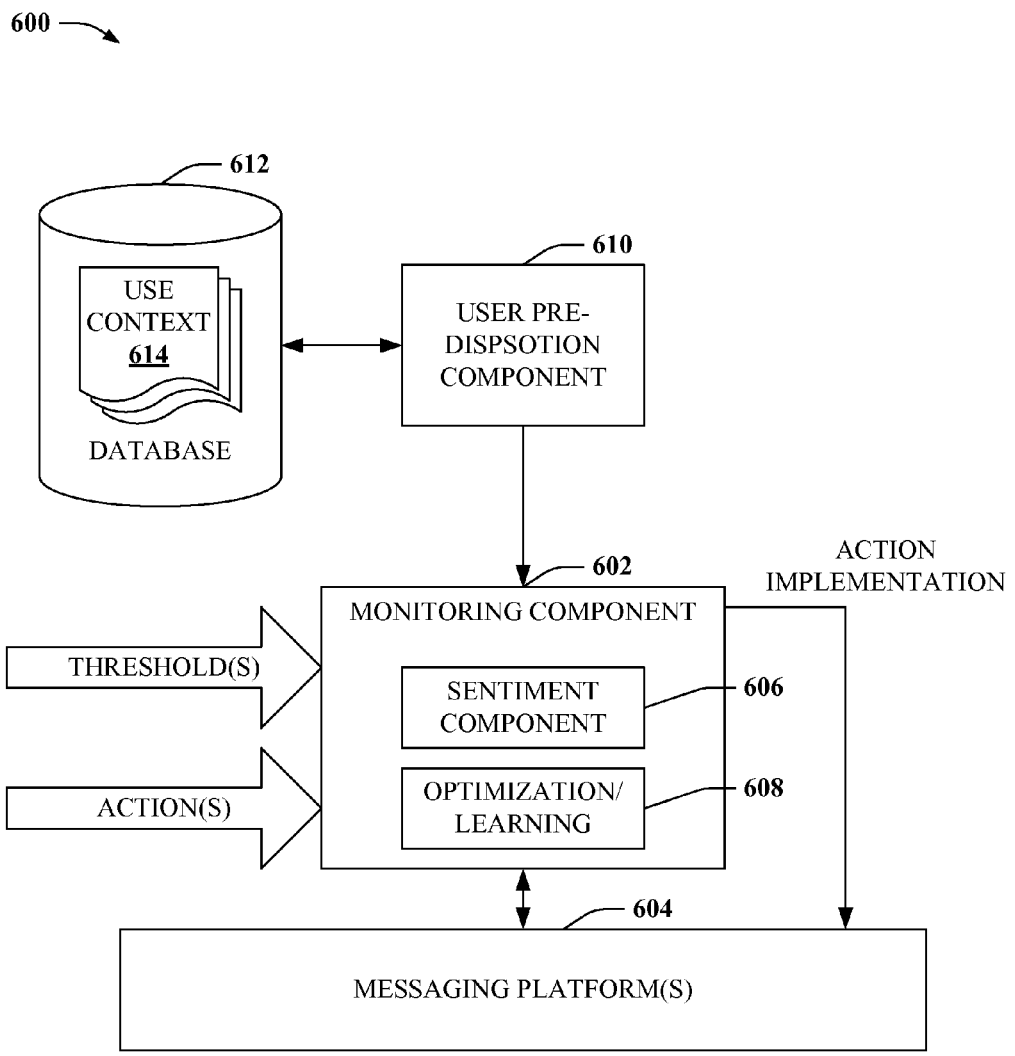
FIG. 6 illustrates a block diagram of an example system that monitors message sentiment and can perform actions based on sentiment thresholds.

FIG. 6 illustrates a block diagram of an example system 600 that monitors message sentiment and performs predetermined actions based thereon. Actions can be determined by comparing one or more sentiment thresholds versus the message sentiment. In addition, system 600 can monitor child messages that spawn off of a parent message (e.g., forwarded messages, replied messages, etc.) and determine an overall sentiment of a chain of messages as the messages are sent or distributed. Determination is based on message content and can be compared to predispositions of participants of the message chain, determined from user use contexts of such participants. In practice, system 600 can be utilized to stop propagation of unproductive, offensive, or like messages, or promote productive and encouraging messages, or like applications.

System 600 can comprise a monitoring component 602 that monitors data included in messages sent via a messaging platform(s) 604. Messages can be monitored individually, or monitored in combination with child messages spawned off of a message parent. A sentiment component 606 can analyze the data and determine message sentiment, as described herein (e.g., see FIG. 5, supra). Sentiment for individual parent messages is determined, and the sentiment can then be modified for a chain of messages based on the content of children messages tied to the parent message. In some aspects, monitoring component 602 can employ a machine learning and optimization 608 to determine and update the sentiment, based on data models or trained classifiers, as described herein or known in the art.

Monitoring component 602 can determine participants of a message or message chain and query a user predisposition component 610 to obtain dispositions of the participants. Participant dispositions can be determined from user use context information 614 stored in a database 612 coupled with the user predisposition component 610.

In addition to the foregoing, monitoring component 602 can compare participant dispositions with one or more disposition thresholds received by monitoring component 602. Such disposition thresholds can be entered by a network manager, office manager, company executive, and so on, as a mechanism to define an acceptable content or sentiment range for electronic messages. By employing such thresholds, monitoring component 602 can determine whether one or more threshold actions should be taken (e.g., stop propagation of a message or chain of messages, including subsequent message spawns, add participants to a message chain where subject matter or message sentiment are pertinent or appropriate for such participants, and so on). Actions are sent to the messaging platform 604, which can implement the actions from a messaging control server (not depicted). Thus, based on the disposition thresholds and threshold actions, system 600 can facilitate automated management of electronic messaging to promote desired sentiments and prevent undesired sentiments in a social or enterprise network.

The aforementioned systems have been described with respect to interaction between several components. It should be appreciated that such systems and components can include those components or sub-components specified therein, some of the specified components or sub-components, and/or additional components. For example, a system could include user interface component 504, language processor 502, guidance component 508, databases 512 and 612, monitoring component 602 and user predisposition component 610, or a different combination of these and other components. Sub-components could also be implemented as components communicatively coupled to other components rather than included within parent components. Additionally, it should be noted that one or more components could be combined into a single component providing aggregate functionality. For instance, monitoring component 602 can include user predisposition component 610, or vice versa, to facilitate monitoring sentiment of electronic messages and obtaining user predisposition by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 7:
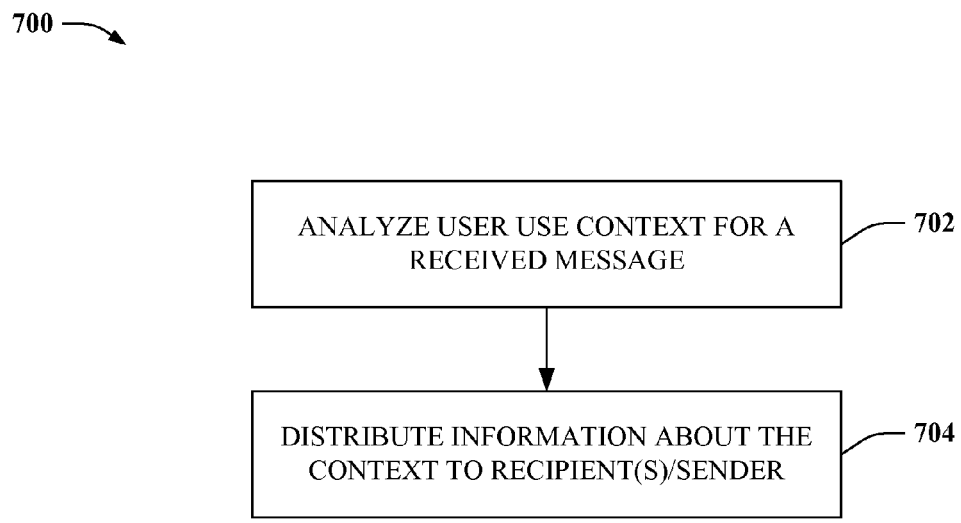
FIG. 7 illustrates a flowchart of an example methodology for providing user use context for electronic messaging according to further aspects disclosed herein.
Figure 8:
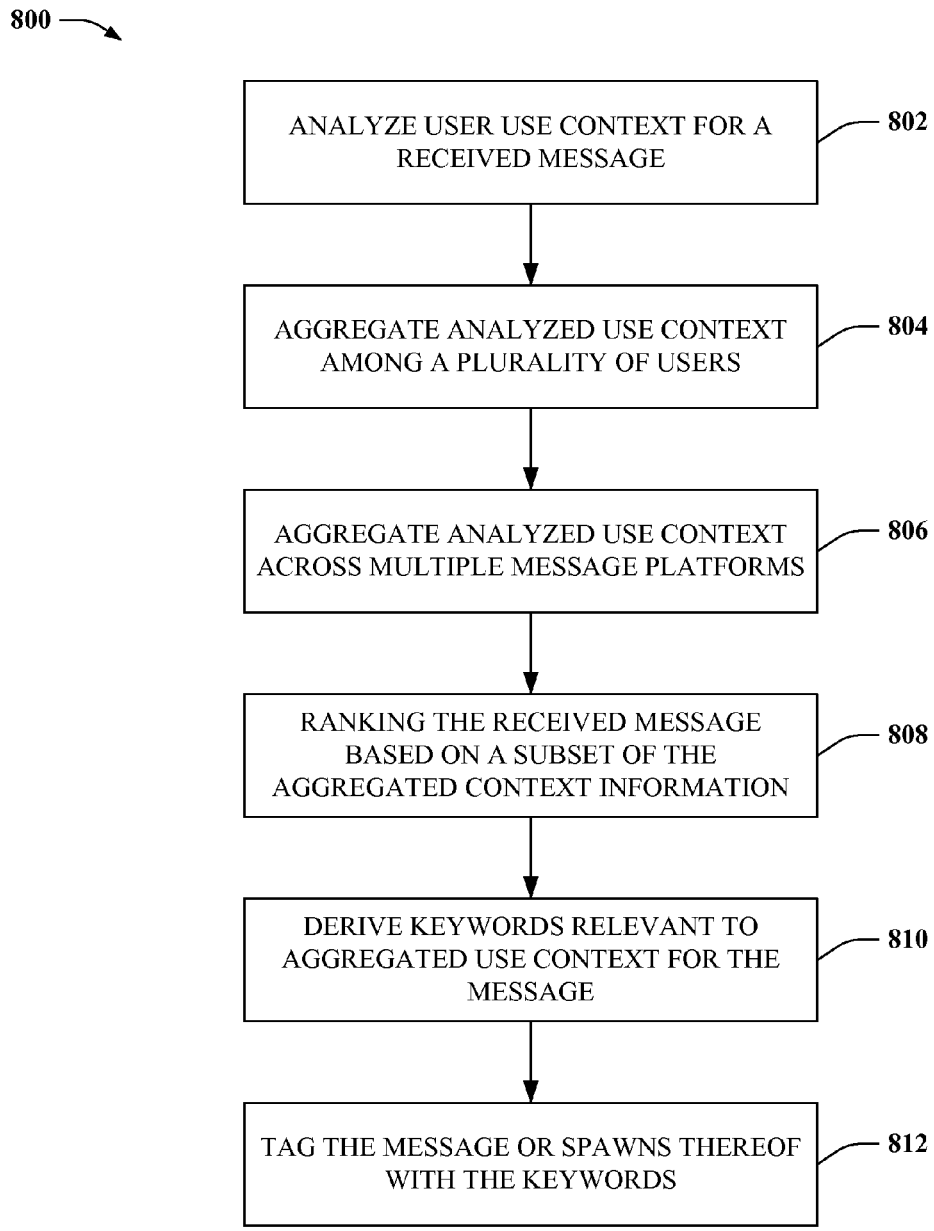
FIG. 8 depicts a flowchart of a sample methodology for determining user perception of electronic messaging for a community of users.
Figure 9:
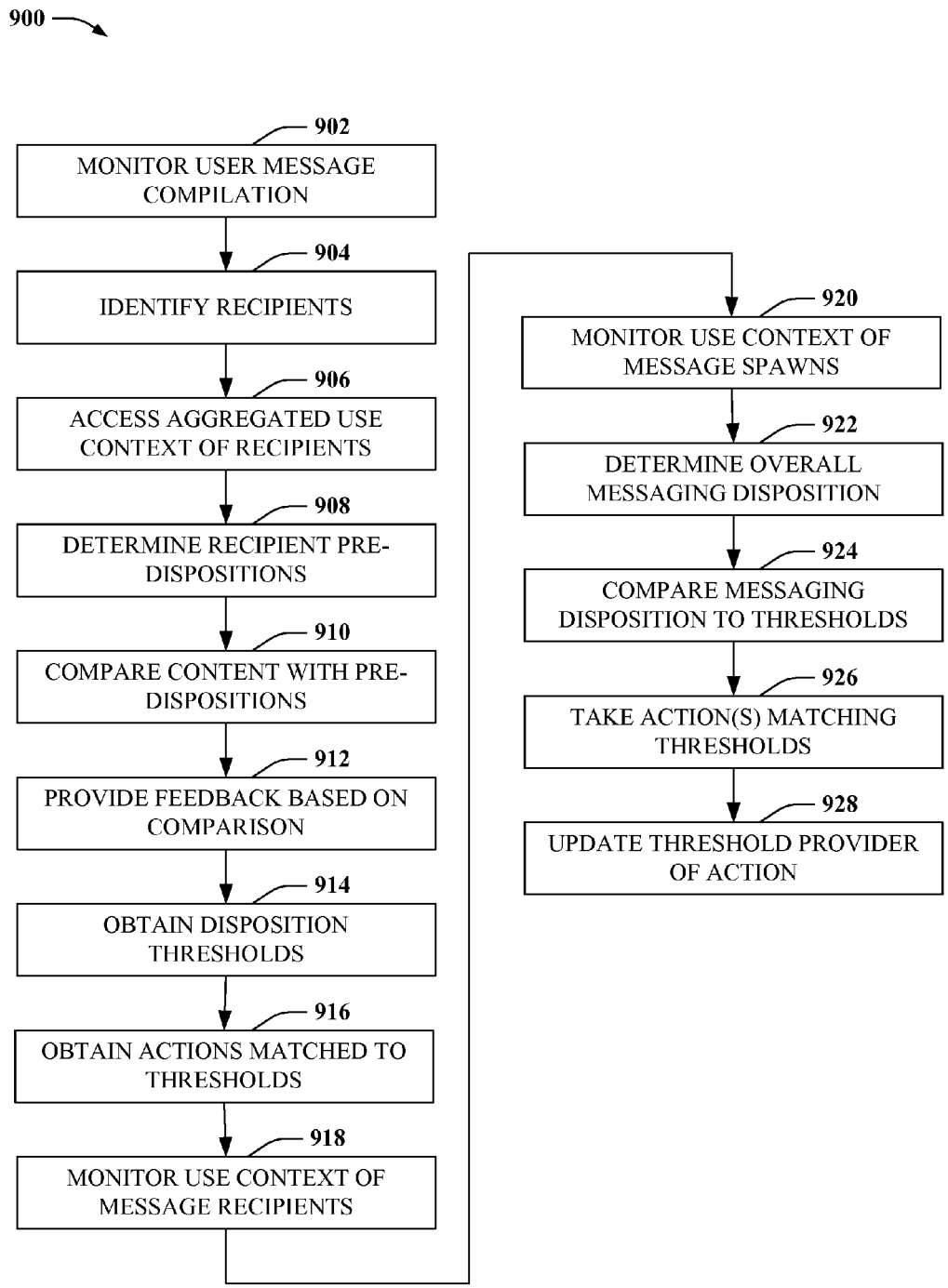
FIG. 9 illustrates a flowchart of an example methodology for employing user context in monitoring and providing predictive feedback for electronic messaging.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

FIG. 7 illustrates a flowchart of an example methodology 700 for providing user use context for electronic messaging according to further aspects disclosed herein. At 702, method 700 can analyze user use context for a received message. The user use context can be based on a user's interaction with or response to the received message via a messaging interface (e.g., a user interface). In addition, the user use context can be determined based on content of the received message, and a tone or sentiment of such content. User interaction/response can comprise user interface actions relating to the received message, such as opening, forwarding, deleting, copying, replying to, saving, or tagging the message, or like user interface actions, or a combination thereof. Additionally, the user use context can be optimized over time, based on usage data models or trained classifiers employing user action data analyzed over multiple received messages. Statistical models can be constructed, based on time to perform an action, a number of actions performed, frequency of one or more actions, and so on. Such models can be utilized to maintain a dynamic use context for the user, optimized over time and reflecting changes in the user's interactions with such messages. Additionally, a user's disposition toward a particular message can be inferred based on interaction/response to a particular message as compared with the statistical models.

At 704, method 700 can distribute a subset of the user use context information to a sender of the received message, to the recipient, or to other recipients of the message. Such distribution can be helpful to the sender, by indicating recipient perception(s) of the electronic message. Thus, the sender can employ the distributed information as a learning tool with which to improve electronic communications with recipients in subsequent messages. As described, method 700 can provide a powerful tool for incorporating user contextual information, heretofore available only through direct inter-personal communication, into electronic communication. Such a result can greatly enhance the power and effectiveness of electronic communication, magnifying the practical benefits thereof.

FIG. 8 depicts a flowchart of an example methodology 800 for providing aggregated user use context for electronic messaging. At 802, method 800 can analyze user use context for a received electronic message, as described herein. At 804, method 800 can aggregate analyzed use context among a plurality of users. For instance, individual user use context can be determined based on individual interactions with/responses to a messaging system. The individual context can then be combined and stored in a pooled data file, for instance. At 806, method 800 can aggregate analyzed use context across multiple message platforms. Such platforms can include e-mail, text messaging, short message service, website forum posts, website blogging, voice-to-text or voice-to-data communication on a computer, VoIP device, or telephone, and so on.

According to some aspects of the subject disclosure, the aggregated individual context and aggregated multi-platform context can optionally be further aggregated into a user context superset, spanning multiple users and multiple communication platforms. Furthermore, context data can be monitored and collected for users and various platforms over time. Such data can be aggregated as a function of time, providing a high-level measure of inter-relatedness, tone, health and sentiment. In addition, user use patterns and changes in such patterns can be determined over time. For instance, if a user typically has a different mood in the morning as opposed to the evening, patterns in user message perception can be identified throughout the day and referenced in a use context file for that user. Likewise, if a user prefers e-mail in the morning and short message service, or another messaging platform in the evening, the use context file can maintain such information as well. Accordingly, time-based variations in usage can provide useful information for determining disposition of users.

In addition, an aggregated superset of use context data can be categorized as a function of various categories of interest. Such categories can include per user context, per region context (e.g., based on user(s) location(s)), per message system context (including, e.g., different messaging platforms, different messaging products, different product versions, and so forth), per social network contexts, per enterprise contexts, per group/team/organization contexts, and the like. The data superset can be utilized to normalize individual or group use context across a rich variety of user contexts.

At 808, method 800 can rank a received message based on a subset of aggregated contextual information. Ranking can comprise a value on a quantitative scale, a degree on a qualitative scale, or the like. Additionally, at 810, method 800 can derive keywords relevant to the aggregated use context for the message. The keywords can be obtained from a pool of such keywords, selected to be representative of recipient response(s) to the message, optionally normalized over the aggregated contextual data. At 812, method 800 can tag the message or spawns of the message with the keyword, and distribute the tags to a message sender/recipient, or deliver the message bundled with the tags. As described, method 800 provides a useful mechanism to include user contextual feedback for electronic messaging.

FIG. 9 illustrates a flowchart of an example methodology 900 for employing user context in monitoring and providing predictive feedback for electronic messaging. At 902, method 900 can monitor user compilation of an electronic message, and, at 904, identify recipients of the electronic message. At 906, method 900 can access an aggregated use context of the identified participants. At 908, method 900 can determine electronic messaging predispositions of the identified participants, based on individual user data within the aggregated use context, or as a general disposition based on the aggregated context.

At 910, method 900 can compare content of the electronic message with the user predispositions. At 912, method 900 can provide feedback based on the foregoing comparison. The feedback can be distributed to the sender of the electronic message, to recipients of such message, or to a managing entity responsible for monitoring electronic messaging employed by the sender and participants.

At 914, method 900 can obtain one or more disposition thresholds and, at 916, one or more threshold actions matched to the disposition thresholds. At 918, method 900 can monitor use context of recipients of the message. The monitoring can comprise, for instance, determining a sentiment of the electronic message, based on the message content, compared with the predispositions of the recipients. At 920, method 900 can monitor content of message spawns comprising a chain of messages related to the electronic message. At 922, method 900 can determine an overall disposition of the messaging chain. Furthermore, at 924, method 900 can compare the overall disposition of the messaging chain, and/or a disposition of the electronic message, to the disposition thresholds. At 926, method 900 can implement one or more actions based on the comparison. For instance, if the disposition of the message chain exceeds an allowable sentiment threshold, the message chain can be prevented from further dissemination. Alternatively, or in addition, if the message chain meets an interest threshold pertinent to a group of users, the message can be distributed to additional recipients not included in the message chain. At 928, a provider of the disposition thresholds and threshold actions can be updated based on the results of the foregoing comparison, and based on any threshold actions taken by method 900. Thus, method 900 can act as an electronic monitor or chaperone for a messaging platform, determining message sentiment and taking predetermined actions based thereon.

Figure 10:
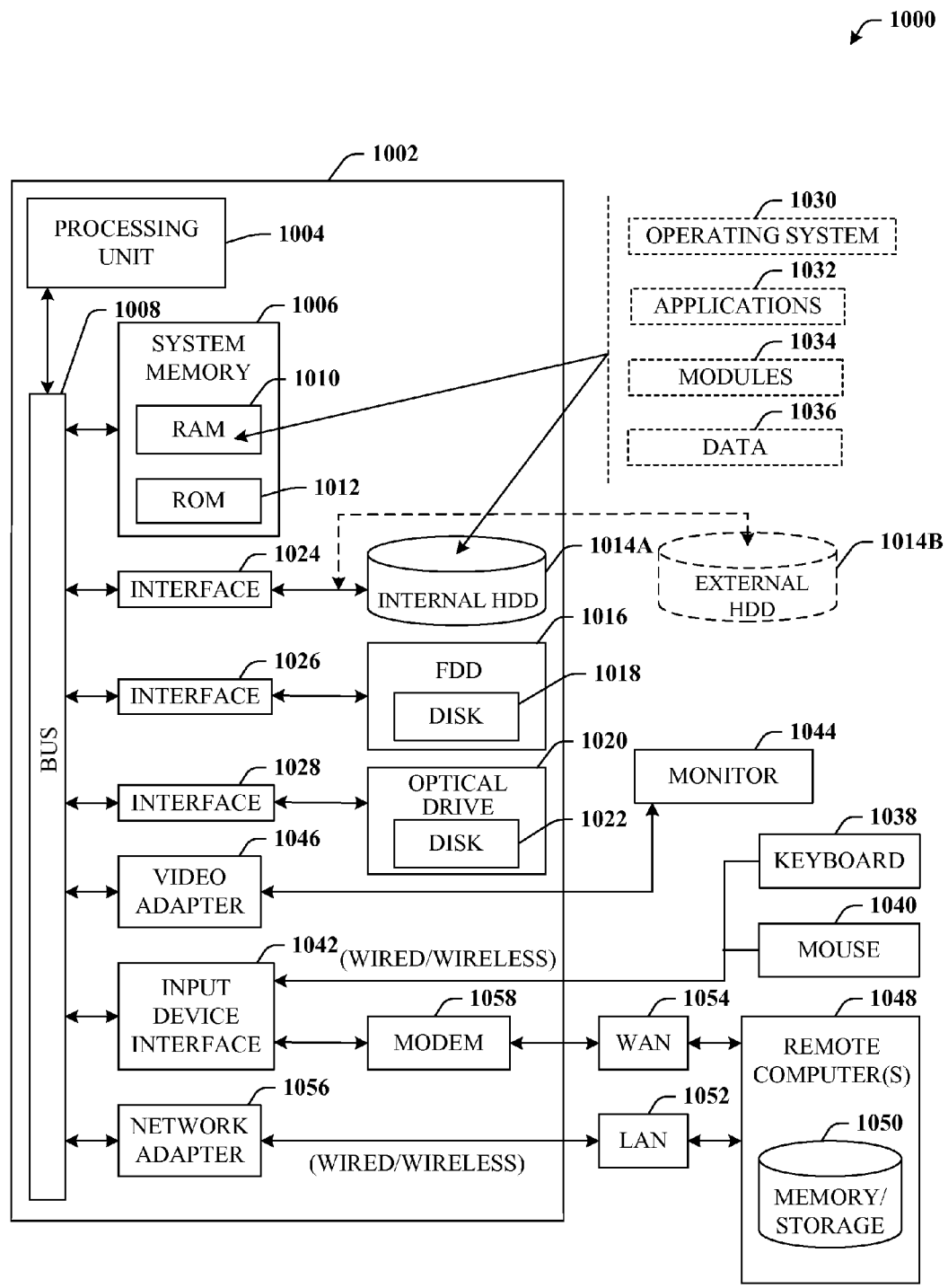
FIG. 10 depicts a block diagram of an example operating environment suitable to process and store user use data according to some disclosed aspects.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above can be suitable for application in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014A (e.g., EIDE, SATA), which internal hard disk drive 1014A can also be configured for external use (1014B) in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
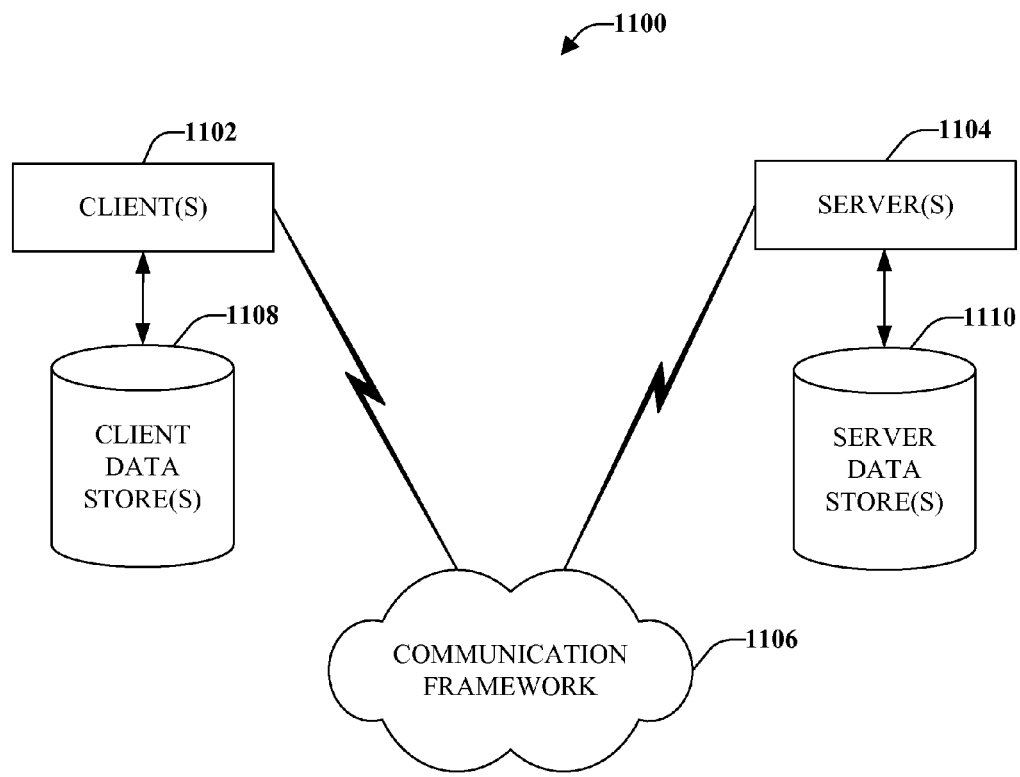
FIG. 11 depicts a block diagram of an example remote communication environment providing remote messaging and data analysis in other disclosed aspects.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art can recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various methods.

In addition, while a particular feature may have been disclosed with respect to only one of several implementations, such feature can be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A device comprising:
   one or more processors;
   memory;
   a context component stored in the memory and executable by the one or more processors to analyze user use context of an interaction with a message;
   a guidance component stored in the memory and executable by the one or more processors to:
      employ language processing to analyze content of the message before the message is delivered and to determine a style or a sentiment of the content;
      reference the user use context based at least on the style or the sentiment of the content;
      provide real-time feedback for the style, the sentiment or the content of the message based on composition of the message and the user use context of the interaction with the message; and
   a distribution component stored in the memory and executable by the one or more processors to distribute information of the user use context to a recipient or a sender of the message.

2. The device of claim 1, further comprising a data compilation component that aggregates user use context of the message across one or more recipients, and makes available a subset of aggregated information to the recipient or the sender of the message.

3. The device of claim 2, further comprising a grading component that ranks the message as a function of the aggregated information, and provides ranking information of the message to the recipient or the sender of the message.

4. The device of claim 1, wherein the user use context comprises one or more of:
  whether the message was deleted, responded to, tagged, forwarded or opened;
  how long before the message was deleted, responded to, tagged, forwarded or opened; or
  a location of a device of a user associated with the user use context.

5. The device of claim 1, further comprising a messaging unification component that aggregates the user use context of the message with another user use context of a disparate type of received message to obtain a unified user communication context.

6. The device of claim 1, further comprising a user predisposition component that employs the user use context to compile a relative messaging predisposition for a participant of the message.

7. The device of claim 1, further comprising a monitoring component that:
  obtains a sentiment threshold and a threshold action pertaining to the message;
  monitors the sentiment of the content of the message or a content sentiment of one or more additional messages pertaining to the message; and
  implements the threshold action if the sentiment of the content of the message or the content sentiment of the one or more additional messages exceeds the sentiment threshold.

8. A system comprising:
  one or more processors;
  memory;
  a context component stored in the memory and executable by the one or more processors to analyze a user context of a user related to an electronic message against a baseline context, the baseline context being generated based at least on aggregated user context information of a plurality of users;
  a guidance component stored in the memory and executable by the one or more processors to:
    employ language processing to determine a style or sentiment of content of the electronic message;
    reference the user context; and
    make available feedback, selectively as the electronic message is compiled, based on a composition of the electronic message and a subset of the user context; and
  a distribution component stored in the memory and executable by the one or more processors to disseminate information of the user context to a recipient or a sender of the electronic message.

9. The system of claim 8, further comprising a data compilation component that aggregates user use context of the electronic message across a plurality of participants and makes available a subset of the aggregated user use context to other participants of the electronic message.

10. The system of claim 8, further comprising a grading component that ranks the electronic message as a function of aggregated user context information across a plurality of participants and distributes a ranking result to one or more recipients or the sender of the electronic message.

11. The system of claim 10, further comprising a relativity component that modifies the ranking result based on a significance of a participant of the plurality of participants and use context of the participant of the plurality of participants.

12. The system of claim 8, further comprising a messaging unification component that aggregates user use context pertaining to the message across a plurality of messaging systems.

13. The system of claim 8, wherein the guidance component further suggests modifying the style, the sentiment or the content of the message based on a user use context of a participant.

14. The system of claim 8, further comprising a monitoring component that compares the sentiment of the message, determined from the user context, with a sentiment threshold and implements an action based on a comparison result.

15. The system of claim 14, the monitoring component employs an aggregated user use context of a plurality of participants of the message to determine the sentiment.

16. A method implemented by a computing device, the method comprising:
  analyzing a user context of a user related to an electronic message against a baseline context, the baseline context being based at least on aggregated user context information of a plurality of users;
  determining a style or sentiment of content of the electronic message;
  making available feedback, selectively as the electronic message is compiled, based on a composition of the electronic message and a subset of the user context; and
  disseminating information of the user context to a recipient or a sender of the electronic message.

17. The method of claim 16, further comprising aggregating user use context of the electronic message across a plurality of participants and making available a subset of the aggregated user use context to one or more participants of the electronic message.

18. The method of claim 16, further comprising ranking the electronic message as a function of aggregated user context information across a plurality of participants and distributing a result of the ranking to the recipient or the sender of the electronic message.

19. The method of claim 18, further comprising modifying the result of the ranking based on a significance of a participant of the plurality of participants and use context of the participant of the plurality of participants.

20. The method of claim 16, further comprising employing an aggregated user use context of a plurality of participants of the electronic message to determine the sentiment.

* * * * *